United States Patent Office 3,128,316
Patented Apr. 7, 1964

3,128,316
REACTION OF TRICYCLIC PERHYDROAROMATIC HYDROCARBONS
Abraham Schneider, Overbrook Hills, Pa., assignor to Sun Oil Company, Philadelphia, Pa., a corporation of New Jersey
No Drawing. Filed Aug. 7, 1962, Ser. No. 215,271
20 Claims. (Cl. 260—666)

This invention relates to the catalytic reaction of perhydroaromatic hydrocarbons which have three rings and twelve or more carbon atoms per molecule. The process is capable of producing a variety of products depending upon the starting perhydroaromatic hydrocarbon used and the particular reaction conditions employed. Generally these products, except for some by-products formed in minor amounts, have the same numbers of carbon and hydrogen atoms as the original material and are polynuclear saturated compounds having condensed ring systems. In other words, the major products are isomers of the perhydroaromatics used.

The charge material for the present process is any perhydroaromatic hydrocarbon which has three rings and at least twelve carbon atoms. The rings can be condensed or uncondensed, and all of them need not be six-membered rings. For example, the starting hydrocarbon can be perhydroacenaphthene which has twelve carbon atoms and the following structure:

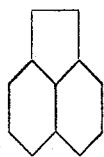

in which one of the rings is five-membered and hence not itself perhydroaromatic. The other two rings correspond to naphthalene after complete hydrogenation and accordingly constitute a perhydroaromatic system. An example of an uncondensed perhydroaromatic of the class specified is perhydroterphenyl. This compound has eighteen carbon atoms and three cyclohexane rings joined in a chain. Spiro compounds which are perhydroaromatics of the type defined above can also be used.

As a general rule perhydroaromatics of the class used in practicing the present invention are not readily available. However, the corresponding aromatic hydrocarbons can be derived from sources such as straight run or cracked petroleum fractions and coal tar. Hence, such aromatic hydrocarbons can serve as suitable starting material and can be readily converted into perhydroaromatics for use in the present process by complete hydrogenation utilizing a suitable catalyst. One suitable catalyst for this purpose is Raney nickel. Appropriate hydrogenation conditions when using this catalyst include a temperature of 200–275° C., a hydrogen pressure of 2000–4000 p.s.i.g., a catalyst to hydrocarbon weight ratio of 1:4 to 1:20 and a reaction time of 2–12 hours. Other suitable catalysts that can be used include platinum, cobalt molybdate, nickel tungstate, or nickel sulfide-tungsten sulfide, with these hydrogenating components being deposited on alumina. Platinum reforming catalysts available commercially can be used for this purpose. These other catalysts generally are used at the same pressure but at higher temperatures than Raney nickel, such as 300–400° C., in order to effect complete hydrogenation of the aromatic hydrocarbon.

Table I gives examples of aromatic hydrocarbons that can be hydrogenated to produce perhydroaromatics for use in the present process.

Table I

| Aromatic | Number of Carbon Atoms | Structural Formula |
|---|---|---|
| Acenaphthene | 12 | |
| 2,3-Cyclopentanoindane. | 12 | |
| Hydrindacene | 12 | |
| 6,7-Cyclopentanoindane. | 12 | |
| Fluorene | 13 | |
| 1,2-Cyclopentanonaphthalene. | 13 | |
| 2,3-Cyclopentanonaphthalene. | 13 | |
| Phenalene (Perinaphthene). | 13 | |
| Homotetraphthene | 13 | |
| Anthracene | 14 | |
| Phenanthrene | 14 | |

Table 1—Continued

| Aromatic | Number of Carbon Atoms | Structural Formula |
|---|---|---|
| Indane-1-spiro-cyclohexane | 14 | |
| Tetralin-2-spiro-cyclopentane | $C_{14}$ | |
| 1,2-; 3,4-dibenzo-cycloheptatriene | $C_{15}$ | |
| 2-Phenylnaphthalene | $C_{16}$ | |
| Terphenyl | $C_{18}$ | |

The compounds shown in Table I are merely exemplary of the types of aromatics that can be converted by hydrogenation into perhydroaromatics which are useful in practicing the present invention. Numerous other aromatics having three rings and at least twelve carbon atoms can also be used. These include aromatics having non-cyclic aliphatic substituents such as methyl, ethyl, and higher alkyl groups as well as olefinic and acetylenic groups. The number of carbons in the aromatic exceeding the minimum of twelve is not critical, as the perhydroaromatic obtained by hydrogenation will undergo reactions within the scope of the invention regardless of the total number of carbon atoms per molecule. However, if it is desired to minimize side reactions so as to obtain predominantly isomers of the starting perhydroaromatic, then the number of carbon atoms in the perhydroaromatic charge generally should not exceed sixteen to eighteen depending upon the reaction temperature used. With perhydroaromatics of the $C_{12}$–$C_{14}$ range, side reactions leading to the formation of degradation products occur only to a small extent and the product is preponderantly one or more isomers of the charge compound.

According to the invention perhydroaromatic hydrocarbons having three rings and twelve or more carbon atoms are reacted at temperatures in the range of −5° C. to 50° C. in the presence of an aluminum halide catalyst. I have found that under such conditions perhydroaromatics of the type specified will undergo rearrangements to form various types of derivatives. I have further found that a series of stepwise reactions take place whereby the overall reaction occurs in more or less well defined stages and that the reaction can be stopped at any stage desired. Different compounds appear as the major product at the different stages. Hence it is possible with the same perhydroaromatic charge compound to obtain any one of several different hydrocarbons as the main product depending upon at which stage the reaction is terminated.

The main factors that determine what particular hydrocarbon is obtained as the main product of the reaction are as follows:

(1) Number of carbon atoms in the starting perhydroaromatic hydrocarbon.
(2) The reaction temperature selected within the overall range of −5° C. to 50° C.
(3) The time of reaction.
(4) The amount of catalyst relative to the amount of total hydrocarbon in the reaction mixture.

By appropriate correlation of the factors listed as (2), (3) and (4), the present invention can be utilized to produce any one of several hydrocarbon products from any particular perhydroaromatic of the class specified. If the reaction is allowed to proceed through all of the possible stages, the main end product will be hydrocarbons of adamantane structure regardless of the number of carbon atoms contained in, and the particular structure of, the starting perhydroaromatic. Other products obtainable by stopping the reaction at earlier stages are various intermediates that are thermodynamically less stable than the products of adamantane structure. The adamanatane type products have two or more substituent methyl groups with the number thereof depending upon the number of carbon atoms in the original perhydroaromatic. Prior to completion of the overall reaction adamantanes present include isomers in which some of the methyl substituents appear at non-bridgehead positions of the adamantane structure. If the reaction is allowed to run its full course, all methyl groups will shift to the bridgehead positions except in cases where the number of methyl groups exceeds the four possible bridgehead positions available in the adamantane structure. Thus the final products obtainable in all cases when the reaction is allowed to run its full course can be designated as "bridgehead adamantanes" in which the methyl groups appear only at the bridgehead positions except when excess methyl groups (more than four) are present, in which case only the excess groups are located at non-bridgehead positions in the structure. These bridgehead adamantanes are distinctly lower boiling than their non-bridgehead isomers.

The following are examples of transformations that can be effected by means of the invention to obtain in good yield compounds that are intermediates between the original perhydroaromatic used and the adamantane products obtainable therefrom.

I. $C_{12}$ PERHYDROAROMATICS

Conversion to perhydroacenaphthene in which the decalin portion of its structure has trans configuration.

II. $C_{13}$ PERHYDROAROMATICS (a) Conversion from cis to trans form.
(b) Conversion to perhydrobenzonaphthene.

III. $C_{14}$ PERHYDROAROMATICS (a) Conversion to trans-syn-trans perhydroanthracene.
(b) Conversion to methyl perhydrobenzonaphthene.

IV. $C_{15}$ PERHYDROAROMATICS (a) Conversion to trans-syn-trans 2-methylperhydroanthracene.
(b) Conversion to dimethylperhydrobenzonaphthene.

V. HIGHER PERHYDROAROMATICS

These undergo transformations analogous to the lower molecular weight perhydroaromatics listed above. In other words there is a conversion initially to compounds of trans form which conversion may or may not involve a skeletal rearrangement of carbon atoms, conversion of these trans compounds to alkyl-substituted perhydrobenzonaphthenes, conversion of the latter to adamantanes with some of the bridgehead positions unsubstituted, and finally conversion of these intermediates to adamantanes in which all bridgehead positions have methyl substituents. In addition to the foregoing isomerization reactions, there is, for the higher perhydroaromatics, a tendency for degradation to occur during the reaction and this tendency becomes more pronounced as the molecular weight of the starting material increases. This degradation involves the splitting out of isobutane, and other isoparaffins to less extent, from the adamantane type product with a corresponding reduction in its molecular weight. For example, $C_{18}$ polymethyladamantanes tend to lose isobutane and become $C_{14}$ adamantanes. If the isomerization reaction is allowed to follow its entire course, the $C_{14}$ adamantanes will eventually become bridgehead $C_{14}$ adamantane or in other words 1,3,5,7-tetramethyladamantane. Thus some of the products derived from the higher perhydroaromatics can be the same as those derived from perhydroaromatics of the $C_{12}$–$C_{15}$ range. In any event methyl-substituted adamantanes are always produced when the reaction is permitted to proceed to completion. The reaction of the higher perhydroaromatics generally should be carried out in the presence of a source of hydrogen atoms as described hereinafter.

An aluminum halide catalyst obtained by combining $AlCl_3$ with HCl or $AlBr_3$ with HBr is used to effect all of the reactions contemplated within the scope of the invention. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. The catalyst complex is a colored mobile liquid and typically is bright orange-yellow. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. A slow degradation of the catalyst generally will occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials having high catalytic activity.

When the aluminum halide is $AlBr_3$, the catalyst can also be used with the $AlBr_3$ dissolved in the hydrocarbon reactant so that the reaction mixture is homogeneous. When using this type of catalyst system, the $AlBr_3$ is dissolved in the hydrocarbon charge to the extent of 5–200% by weight on the hydrocarbon and HBr is pressured into the mixture in amount of at least 0.25% by weight of the hydrocarbon. The resulting reaction mixture remains homogeneous as the reaction occurs. With $AlCl_3$ a homogeneous system cannot be used since $AlCl_3$ is essentially insoluble in hydrocarbons.

The present process is carried out by contacting the aluminum halide catalyst with the hydrocarbon reactant at a suitable temperature within the general range of −5° C. to 50° C. The temperature within this range that should be selected will depend upon the particular perhydroaromatic charged to the process, the particular reaction product desired and the other conditions of reaction such as catalyst to hydrocarbon ratio and reaction time. The effects of these variables are shown more fully hereinafter. In cases where the reaction product is a solid at the reaction temperature used, it is advantageous to employ a hydrocarbon diluent that is largely inert under the reaction conditions in order to keep the product in solution. Examples of relatively inert diluents are butane, pentane, hexane, cyclopentane, cyclohexane, methylcyclopentane and methylcyclohexane. After the reaction has proceeded to the desired stage, the catalyst is separated from the hydrocarbon material and the latter can be distilled to obtain the desired product or products. When an aluminum halide complex, as described above, is used as catalyst, the reaction mixture can be settled to separate the complex phase from the hydrocarbons and the catalyst complex can be recycled and reused. The hydrocarbon phase can, if desired, be washed with water to remove any catalyst residues prior to being fractionated into the desired products. When $AlBr_3$—HBr is used as a soluble catalyst, the HBr and hydrocarbons can be separately recovered by distillation from the $AlBr_3$ and the hydrocarbons can then be fractionated to yield appropriate product fractions.

For the purpose of more specifically describing the invention in its various aspects, the discussion which follows is divided into sections according to the number of carbon atoms in the perhydroaromatic used as starting material.

$C_{12}$ PERHYDROAROMATICS

Table I supra gives examples of four tricyclic aromatics which upon hydrogenation will yield $C_{12}$ perhydroaromatics for use in the present process. For purpose of discussion, perhydroacenaphthene is taken as exemplary of the $C_{12}$ perhydroaromatics. This material when obtained by hydrogenating acenaphthene using a Raney nickel catalyst is a mixture of four stereo isomers in which the cis form predominates. In the transformation of this material the first compound isolatable as a major product is a single perhydroacenaphthene isomer in which the decalin portion of its structure has trans configuration. This isomer is believed to be the one that can be illustrated as follows:

wherein the heavy dots represent hydrogen atoms projecting upwardly from the surface of the molecule. As the reaction proceeds, three of the four isomers rapidly undergo isomerization, and the single isomer of trans configuration can be obtained in good yield if desired by stopping the reaction at this stage. In view of the rapidity of the reaction a low reaction temperature should be used to obtain this isomer product, viz., a temperature in the range of −5° C. to 10° C. Also the use of a relatively high volume ratio of hydrocarbon to catalyst complex in the reaction mixture, such as between 3:1 and 20:1, will help to prevent the reaction from proceeding beyond this initial stage. The time at which the maximum yield of the trans isomer is obtained under these conditions generally is of the order of 1-3 hours.

Continuing in the reaction series for perhydroacenaphthene, it seems likely that one or more intermediate structures between the trans isomer and the adamantane structure are involved in the reaction mechanism, but such intermediates are so transitory that they cannot be isolated practicably. Hence dimethyladamantanes are the next type of product that appears in substantial yield. In order to carry the reaction to this stage a temperature in the range of 20-50° C., more preferably 25-40° C., should be used. The hydrocarbon to catalyst complex volume ratio can range from small to large, such as from 0.1:1 to 20:1, but it is advantageous to use a relatively small ratio, such as 1:1 or 2:1, to expedite the reaction. As the dimethyladamantane content builds up in the mixture, only a small amount of isomers having one or both methyl groups located at non-bridgehead positions are observed and the major and final product of the reaction is 1,3-dimethyladamantane.

Other $C_{12}$ perhydroaromatics undergo reactions analogous to those described above for perhydroacenaphthene. A specific illustration of the process as applied to perhydroacenaphthene is given in the following example in which percentages are by weight.

EXAMPLE I

A catalyst complex was prepared by bubbling HBr into a mixture of 5 g. of $AlBr_3$ and 8 ml. of mixed dimethylhexanes at about 50° C. for about 30 minutes. Thereafter the unreacted hydrocarbons were decanted from the catalyst complex layer and about 3 ml. of the layer were obtained. This was a mobile oily liquid having an orange-yellow color. The reaction was carried out in a rocker bomb by contacting the catalyst with 5 ml. of a mixture composed of 72.5% of mixed perhydroacenaphthene isomers (largely cis) and 27.5% of methylcyclohexane, the latter being used as a diluent. The mixture of isomers had the following composition as determined by vapor phase chromatography:

|  | Percent |
|---|---|
| Perhydroacenaphthene I (trans isomer) | 36.5 |
| Perhydroacenaphthene II | 0.6 |
| Perhydroacenaphthene III | 62.6 |
| Perhydroacenaphthene IV | 0.3 |

The temperature initially was maintained at 0° C. and small samples of the hydrocarbon product were taken for analysis at total reaction times of 62 minutes and 182 minutes. Then the temperature was raised to 34-36° C., the reaction was continued and samples of the hydrocarbon product were taken at overall reaction times of 242 minutes and 559 minutes. Analytical results obtained by vapor phase chromatography are shown in Table II.

Table II

| Temperature, °C | 0 | 0 | 34 | 34-36 |
|---|---|---|---|---|
| Reaction time, minutes | 62 | 182 | 242 | 559 |
| Composition of product, weight percent: | | | | |
| $C_4$ paraffins | 0.6 | 0.8 | 1.2 | 3.1 |
| $C_5$ paraffins | 0.4 | 0.6 | 0.7 | 1.6 |
| $C_6$ paraffins | 0.1 | 0.7 | 0.4 | 0.8 |
| Dimethylcyclopentane | 0.1 | 0.3 | 1.0 | 0.8 |
| Methylcyclohexane | 27.8 | 27.7 | 22.8 | 18.0 |
| $C_8$ naphthenes | 0.2 | 0.4 | 0.8 | 1.2 |
| $C_9$ naphthenes | 0.2 | 0.2 | 0.4 | 0.6 |
| $C_{10}$ naphthenes | 0.1 | 0.2 | 0.3 | 0.2 |
| 1,3-Dimethyladamantane | 3.4 | 11.6 | 60.7 | 70.8 |
| Other dimethyladamantanes | 3.6 | 3.0 | 2.2 | 2.0 |
| Perhydroacenaphthene I | 41.1 | 54.6 | 9.6 | |
| Unknown isomerization intermediates | 22.6 | | | 0.8 |

The data given in Table II show that reaction at 0° C. produces mainly the trans isomer listed as perhydroacenaphthene I. Only small amounts of adamantanes were produced at this temperature in about 3 hours reaction time. However, when the temperature was raised to 34-36° C., adamantanes became the major product and 1,3-dimethyladamantane was the main constituent thereof.

$C_{13}$ PERHYDROAROMATICS

Table I lists five $C_{13}$ tricyclic aromatics which can be hydrogenated to yield the corresponding perhydroaromatics. From these perhydrofluorene is selected for purpose of illustration. Hydrogenation of fluorene using Raney nickel will yield a mixture of isomers which are mainly cis form. The first transformation occurring when this material is reacted according to the present invention involves formation of a signal trans isomer just as in the case of perhydroacenaphthene. This reaction occurs very rapidly. Hence, if it is desired to obtain the trans isomer as product, the reaction temperature should be low, e.g. 0° C., the volume ratio of hydrocarbon to catalyst complex should be high, for example, in the range of 3:1 to 20:1, and a short reaction time such as 1-10 minutes should be used.

The next transformation is the conversion of the trans isomer to perhydrobenzonaphthene which has the following structure:

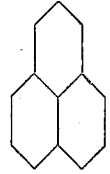

This compound is also known as perhydrophenalene and perhydroperinaphthene. A general temperature range for this reaction is —5° C. to 40° C., but in order to optimize the yield of perhydrobenzonaphthene the hydrocarbon to catalyst ratio and the reaction time should be adjusted in accordance with the temperature selected. With low hydrocarbon to catalyst ratios such as 0.1:1 to 2:1, a low temperature, e.g. 0° C., should be used and the reaction time generally should be in the range of 10 minutes to 2 hours; while at high ratios such as 10:1 to 20:1, a higher temperature, e.g. 25-30° C., should be used with reaction times generally in the range of 0.5-2 hours. By appropriate correlation of these conditions, high yields of this unusual tricyclic naphthene can be obtained.

The next stage of reaction in the $C_{13}$ series involves transformation of the perhydrobenzonaphthene to adamantane type compounds. As initially formed these are predominantly non-bridgehead trimethyladamantanes, i.e., with one or more of the methyl groups at positions other than the bridgehead carbons. However, further reaction converts them to the single $C_{13}$ bridgehead adamantane, namely, 1,3,5-trimethyladamantane. The temperature for promoting the formation of adamantanes generally should be in the range of 20-50° C. and more preferably 25-40° C. The concentration of the non-bridgehead compounds will reach an optimum after a time and will thereafter drop due to isomerization to the bridgehead compound, provided that the hydrocarbon to catalyst ratio is not too high. This optimum usually occurs in 0.5-2 hours when this ratio is low and in 1-20 hours when the ratio is high. In order to force the isomerization further to produce 1,3,5-trimethyladamantane, the hydrocarbon to catalyst ratio should be below 3:1 and a time of 2-10 hours should be used.

Other $C_{13}$ aromatics as illustrated in Table I upon hydrogenation will yield perhydroaromatics which will undergo reactions an analogous to those described above for perhydrofluorene, except that in the case of phenalene the hydrogenation product obtained is prehydrobenzonaphthene so that the reaction of the present process would begin with its transformation to adamantanes.

The process as applied to $C_{13}$ perhydroaromatics is specifically illustrated in Example II for perhydrofluorene.

EXAMPLE II

The reaction was carried out using perhydrofluorene as the reactant. As obtained by hydrogenation this material was composed of three isomers with the cis form predominating, the percentages of the three being 14.9%, 7.7% and 77.4%. A catalyst complex was prepared as in the preceding example and 3 ml. of the complex was contacted with 5 ml. of the isomer mixture initially at a temperature of 0° C. After 78 minutes contact a sample was taken for analysis, and then the temperature was raised to 24–29° C. and contacting was continued. Thereafter samples were taken at total reaction times of 221 and 471 minutes. Analysis by vapor phase chromatography gave the results shown in Table III.

*Table III*

| | | | |
|---|---|---|---|
| Temperature, °C | 0 | 25–29 | 24–27 |
| Reaction time, minutes | 78 | 221 | 471 |
| Composition of product, wt. percent: | | | |
| $C_4$ paraffins | 4.5 | 4.6 | 6.2 |
| $C_5$ paraffins | 4.1 | 3.9 | 4.0 |
| $C_6$ paraffins | 2.3 | 2.1 | 2.4 |
| $C_7$ paraffins | 0.3 | 0.2 | 0.03 |
| Methylcyclohexane | | 0.3 | 0.3 |
| $C_8$ naphthenes | | 0.4 | 0.2 |
| $C_9$ naphthenes | | 0.3 | 0.1 |
| $C_{10}$ naphthenes | | 0.03 | 0.03 |
| Adamantane | | 0.2 | |
| 1,3,5-Trimethyladamantane | 0.5 | 32.4 | 63.3 |
| Non-bridgehead trimethyl-adamantanes | 5.6 | 41.1 | 21.0 |
| Perhydrobenzonaphthene | 82.8 | 14.5 | 2.4 |

From the data in Table III it can be seen that a high yield of perhydrobenzonaphthene is obtained if the reaction is not allowed to proceed too far. By additional reaction either non-bridgehead trimethyladamantanes or 1,3,5-trimethyladamantane can be made as the major product depending upon how long the reaction is permitted to go.

$C_{14}$ PERHYDROAROMATICS

For purpose of discussion perhydrophenanthrene is taken as exemplary of the $C_{14}$ group. Hydrogenation of phenanthrene using a platinum-on-acidic alumina catalyst results in a mixture of four isomers with percentages typically of 73.5%, 13.2%, 11.1% and 2.2%. The trans-anti-trans perhydrophenanthrene is the major component. The first transformation that occurs when this mixture is treated with an aluminum halide catalyst is a simple equilibration between cis and trans forms of perhydrophenanthrene with no structural rearrangement. This reaction occurs very rapidly. Hence if it is desired to carry the reaction no further than this stage, mild reaction conditions should be used such as a temperature of 0° C., a hydrocarbon to catalyst ratio of 10:1 and a reaction time of 1–10 minutes.

The next stage of transformation is an isomerization according to the following equation:

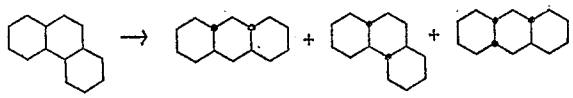

The three isomer products obtained are, respectively, trans-syn-trans perhydroanthracene, trans-anti-trans perhydrophenanthrene and cis-syn-trans perhydroanthracene. The trans-syn-trans isomer is the major product, constituting about 70% of the mixture. If perhydroanthracene is used instead as the starting material, precisely the same mixture of isomers can be obtained. Thus the invention provides a way of producing trans-syn-trans perhydroanthracene in high yield either from perhydrophenanthrene or from other perhydroanthracene isomers. The trans-syn-trans isomer is a solid having a melting point of about 90° C. To obtain this product mild reaction conditions are again used including a temperature in the range of −5° C. to 10° C., hydrocarbon to catalyst ratio of 3:1 to 20:1 and a reaction time between 10 minutes and 3 hours.

The next stage of transformation involves a structural rearrangement resulting in the formation of methylperhydrobenzonaphthene. This product has a melting point of about 30° C. For this reaction temperatures can range from −5° C. to 50° C., depending upon the relative amount of catalyst used and the time allowed for the reaction. For example, if a temperature of 0° C. is used with a hydrocarbon to catalyst ratio in the range of 0.1:1 to 3:1, reaction times of the order of 10 minutes to 2 hours should be allowed. With a temperature of 25–30° C. and hydrocarbon to catalyst ratios from 5:1 to 20:1, times of 0.5–2 hours generally are suitable. There are two positions where substitution of the methyl group on the perhydrobenzonaphthene nucleus can occur, and hence two isomers are obtained. The one which is preponderant appears to have the methyl substituent at the 2-position.

The fourth transformation stage involves the conversion of the methylperhydrobenzonaphthene to non-bridgehead tetramethyladamantanes. For this conversion temperatures in the range of 20–50° C. should be used. A reaction time of the order of 0.5–2 hours is needed when the hydrocarbon to catalyst ratio is below 3:1 and 1–20 hours when the ratio is above this value. The final transformation that can be effected is the isomerization of the non-bridgehead adamantanes to 1,3,5,7-tetramethyladamantane. This is a slow reaction and requires more severe conditions than the preceding reactions. Preferably temperatures of at least 30° C. and hydrocarbon to oil ratios of less than 3:1 are employed. A long reaction time, such as 20 hours, can be used if necessary to obtain a high yield of this compound. The structure of this bridgehead compound produced as end product of the reaction was established by nuclear magnetic resonance, and its melting point was found to be 65–67° C. which is in accord with the value reported for 1,3,5,7-tetramethyladamantane prepared by classical synthesis.

The following example illustrates the conversion of perhydrophenanthrene and stopping the reaction at the stage where trans-syn-trans perhydroanthracene is produced.

EXAMPLE III

A blend containing 58.3% of methylcyclohexane as diluent and 41.7% of the previously mentioned isomer mixture obtained by hydrogenating phenanthrene was used as charge material. 15 ml. of this blend were contacted with 3 ml. of $AlBr_3$ catalyst prepared as described in Example I. The reaction temperature was 0° C. and the time was 37 minutes. Table IV shows the results obtained upon analysis of the reaction mixture by vapor phase chromatography.

*Table IV*

| | |
|---|---|
| Temperature, ° C. | 0 |
| Time of reaction, minutes | 37 |
| Composition of product, wt. percent: | |
| Methylcyclohexane | 58.3 |
| 2-methylperhydrobenzonaphthene | 9.9 |
| 1-methylperhydrobenzonaphthene | 2.3 |
| Trans-syn-trans perhydroanthracene | 20.8 |
| Trans-anti-trans perhydrophenanthrene | 7.7 |
| Cis-syn-trans perhydroanthracene | 1.0 |

The result in Table IV shows that the major product of the reaction was the trans-syn-trans perhydroanthracene isomer. It can be seen that the methylcyclohexane used as diluent was inert under the reaction conditions, since the amount thereof present in the product was precisely the same as in the charge. The methylperhydrobenzonaphthenes obtained represent the beginning of a further stage of reaction as illustrated in the next example.

EXAMPLE IV 40 ml. of the same isomer mixture of perhydrophenanthrenes as used in the preceding example were contacted with 6 ml. of the catalyst complex prepared as in Example I. The reaction temperature was maintained at 27° C. and the reaction time was 40 minutes. Results are shown in Table V.

*Table V*

| | |
|---|---|
| Temperature, ° C. | 27 |
| Reaction time, minutes | 40 |
| Composition of product, wt. percent: | |
| $C_4$ paraffins | 0.7 |
| $C_5$ paraffins | 0.7 |
| $C_6$ paraffins | 0.4 |
| $C_7$ paraffins | 0.1 |
| Methylcyclohexane | 0.2 |
| $C_8$ naphthenes | 0.2 |
| $C_9$ naphthenes | 0.05 |
| $C_{10}$ naphthenes | 0.03 |
| Decalin | Trace |
| Methyladamantane | 0.1 |
| 1,3,5,7-tetramethyladamantane | 0.07 |
| Non-bridgehead adamantanes | 14.9 |
| 2-methylperhydrobenzonaphthene | 65.7 |
| 1-methylperhydrobenzonaphthene | 16.9 |

The data shows that the perhydrophenanthrene under the present reaction conditions can be converted mainly to methylperhydrobenzonapththenes. The yield of the two isomers formed exceeded 80% with the main isomer being the one in which the methyl substituent was at the 2-position. The appearance of non-bridgehead adamantanes in the product represents the beginning of the next stage of reaction which is illustrated in the next example.

EXAMPLE V 35 ml. of the same starting mixture of perhydrophenanthrenes as used in the preceding examples were contacted with 6 ml. of the same catalyst complex at a temperature of 27° C. Samples were taken for analysis at total reaction times of 290, 637 and 751 minutes. The temperature was then raised to 34–37° C. and the reaction was run to an overall time of 958 minutes. Results are shown in Table VI.

*Table VI*

| | | | | |
|---|---|---|---|---|
| Temperature, ° C. | 27 | 27 | 27 | 34–37 |
| Total reaction time, mins. | 290 | 637 | 751 | 958 |
| Composition of product, weight percent: | | | | |
| $C_4$ paraffins | 0.5 | 0.6 | 0.6 | 0.7 |
| $C_5$ paraffins | 0.4 | 0.5 | 0.5 | 0.5 |
| $C_6$ paraffins | 0.2 | 0.1 | 0.2 | 0.4 |
| $C_7$ paraffins | | 0.01 | 0.06 | 0.2 |
| Methylcyclohexane | 0.8 | 0.8 | 0.8 | 0.9 |
| $C_8$ naphthenes | 0.3 | 0.4 | 0.4 | 0.6 |
| $C_9$ naphthenes | 0.1 | 0.1 | 0.2 | 0.3 |
| $C_{10}$ naphthenes | 0.05 | 0.04 | 0.1 | 0.2 |
| Decalin | 0.01 | 0.02 | 0.08 | 0.1 |
| Methyladamantane | 0.8 | 1.6 | 1.7 | 2.8 |
| 1,3,5,7-Tetramethyl-adamantane | 1.1 | 3.3 | 3.9 | 7.5 |
| Non-bridgehead tetramethyl-adamantanes | 36.6 | 55.7 | 60.8 | 72.8 |
| 2-Methylperhydro-benzonaphthene | 44.5 | 27.9 | 23.2 | 9.8 |
| 1-Methylperhydro-benzonaphthene | 14.3 | 9.0 | 7.4 | 3.2 |

From the data given in Table VI it can be seen that the reaction can be carried to a stage at which non-bridgehead tetramethyladamantanes are the major product. These are formed from the methylperhydrobenzonaphthenes which gradually disappear from the reaction mixture. Under the conditions used only small amounts of the bridgehead adamantane were formed. For producing this compound in higher yield, a lower ratio of hydrocarbon to catalyst should be used as illustrated in the next sample.

EXAMPLE VI 3 ml. of the same starting material as used in Examples III, IV and V were contacted with 3 ml. of the same catalyst complex at a temperature of 27–28° C. The ratio of hydrocarbon to catalyst was thus 1:1. Samples were taken for analysis at total reaction times of 120, 186 and 484 minutes. Results are shown in Table VII.

*Table VII*

| | | | |
|---|---|---|---|
| Temperature, ° C. | 28 | 28 | 27 |
| Total reaction time, mins. | 120 | 186 | 484 |
| Composition of product, weight percent: | | | |
| $C_4$ paraffins | 5.3 | 6.5 | 7.8 |
| $C_5$ paraffins | 4.4 | 4.9 | 3.9 |
| $C_6$ paraffins | 2.6 | 3.3 | 2.4 |
| $C_7$ paraffins | | 0.2 | 0.1 |
| Methylcyclohexane | 0.9 | 1.2 | 0.6 |
| $C_8$ naphthenes | Trace | 0.7 | 0.2 |
| $C_9$ naphthenes | 0.6 | 0.4 | 0.1 |
| $C_{10}$ naphthenes | 0.3 | 0.2 | Trace |
| Methyladamantane | 1.8 | 1.9 | 2.1 |
| 1,3,5,7-Tetramethyl adamantanes | 11.0 | 17.4 | 38.6 |
| Non-bridgehead tetramethyladamantanes | 68.3 | 60.7 | 43.1 |
| Methylperhydrobenzonaphthene | 1.4 | | |
| Unknowns | 3.3 | 2.6 | 1.2 |

The data presented indicate that the non-bridgehead compounds will gradually isomerize to 1,3,5,7-tetramethyladamantane. The yield of this compound can be increased by allowing a longer reaction time or by using a still lower hydrocarbon to catalyst ratio or a higher temperature or both. Thus the 1,3,5,7-compound can be obtained as the major product of the reaction. The higher content of $C_4$–$C_7$ paraffins here produced as compared to Examples IV and V indicates a greater degree of degradation under the more stringent reaction conditions here employed.

$C_{15}$ PERHYDROAROMATICS

With $C_{15}$ perhydroaromatics stages of reaction occur which are analogous to those obtained for the $C_{14}$ perhydroaromatics. Methylperhydroanthracene is here used for purpose of discussion. Considering the 1-methyl-trans-syn-trans isomer, the first two stages of reaction which it undergoes can be depicted as follows:

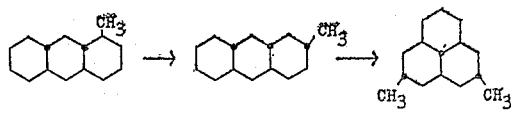

The first step involves a cis-trans type of isomerization and a structural rearrangement with respect to shifting of the methyl group. This isomerization step produces a mixture of isomers in which the major component appears to be the one shown above. The next step comprises a rearrangement to the perhydrobenzonaphthene type of structure, with the main dimethylperhydrobenzonaphthene component being the isomer shown in the equation. Next a rearrangement to non-bridgehead pentamethyladamantanes occurs and finally isomerization to the pentamethyl bridgehead compound takes place. Concurrently with the production of $C_{15}$ adamantanes a degradation reaction occurs to minor extent whereby isobutane splits out and methyladamantane forms.

Reaction of methylperhydroanthracene is illustrated in the following example.

EXAMPLE VII 5 ml. of a blend composed of 51.4% by weight methylcyclohexane as diluent and 48.6% of trans-syn-trans 1-methylperhydroanthracene were contacted with 3 ml. of the catalyst complex prepared as described in Example I. The reaction temperature initially was maintained at 0° C. and samples were taken at total reaction times of 10 and 90 minutes. The temperature was then raised to 28–32° C. and two additional samples were taken at total reaction times of 200 and 440 minutes. Results are shown in Table VIII.

Table VIII

| Temperature, °C | 0 | 0 | 32 | 28 |
|---|---|---|---|---|
| Total reaction time, mins | 10 | 90 | 200 | 440 |
| Composition of product, weight percent: | | | | |
| $C_4$ paraffins | 1.8 | 1.8 | 4.3 | 6.7 |
| $C_5$ paraffins | 1.4 | 1.4 | 1.9 | 2.0 |
| $C_6$ paraffins | 1.7 | 0.7 | 0.9 | 0.8 |
| Methylcyclohexane | 54.0 | 53.2 | 49.5 | 40.7 |
| $C_8$ naphthenes | 0.7 | 0.8 | 2.0 | 3.0 |
| $C_9$ naphthenes | 0.3 | 0.4 | 1.1 | 1.4 |
| $C_{10}$ naphthenes | 0.4 | 0.2 | 1.3 | 1.8 |
| $C_{11}$ naphthenes | 0.3 | 0.2 | | |
| Decalin | | | 0.2 | 0.5 |
| Methyldecalin | 0.1 | 0.3 | 1.5 | 1.5 |
| Methyladamantane | | | 1.6 | 4.1 |
| Dimethyladamantane | | 0.04 | 0.2 | 0.5 |
| Trimethyladamantane | | | 0.2 | 0.5 |
| Bridgehead pentamethyladamantane | | 0.06 | 10.8 | 23.0 |
| Non-bridgehead pentamethyladamantane | | 2.3 | 5.3 | 6.8 |
| Dimethylperhydrobenzonaphthene | 6.5 | 23.6 | 17.6 | 6.8 |
| Methylperhydroanthracene | 33.7 | 15.2 | 1.5 | |

The data in Table VIII show that when a reaction time of 90 minutes was used, dimethylperhydrobenzonapthene was the major product. On the other hand, the major product at 440 minutes reaction time under the conditions used was the bridgehead compound, namely 1,2,3,5,7-pentamethyladamantane. The appearance of methyladamantane at the longer reaction times indicates the occurrence of a minor amount of the type of degradation reaction previously mentioned.

HIGHER PERHYDROAROMATICS

The degradation reaction whereby lower molecular weight adamantanes are produced from adamantanes of higher molecular weight becomes more pronounced as the number of carbon atoms in the starting material increases above fifteen. Since this reaction involves cleavage of isobutane from the polymethyladamantanes, the reaction is hydrogen deficient and hydrogen atoms must be derived from some source. Unless provision is made for supplying hydrogen otherwise, the hydrogen would be derived by abstraction from one or more of the hydrocarbon reactants or products. This would cause the formation of olefinic material which would react with the aluminum halide catalyst and cause it to become deactivated rapidly. In order to prevent this from happening, reaction of the higher perhydroaromatics preferably is carried out in the presence of a source of hydrogen atoms. One suitable source is free hydrogen which is supplied to the reactor so as to maintain its partial pressure preferably in the range of 25–500 p.s.i. The reactor contents should be agitated so as to effect intimate contact between the hydrogen, hydrocarbon reactants and catalyst.

Another way to supply hydrogen atoms for the reaction is to include in the reaction mixture a naphthene of the $C_6$–$C_7$ range, such as methylcyclopentane, cyclohexane, dimethylcyclopentane, ethylcyclopentane or methylcyclohexane. In the reaction of the higher perhydroaromatics, such naphthene does not merely act as a diluent but itself becomes a reactant. Under the reaction conditions these naphthenes will function as hydrogen donors by losing one atom of hydrogen per molecule and the resulting hydrogen-depleted fragments will dimerize to produce methylated decalins. Thus a $C_6$ naphthene will convert to dimethyldecalins and a $C_7$ naphthene will form tetramethyldecalins. These alkyldecalins can be separately recovered as additional products of the process. Due to this dimerization reaction of the hydrogen-depleted naphthene, no substantial amount of olefinic material can build up in the system and rapid deactivation of the catalyst is avoided.

I claim:

1. Method of preparing adamantanes having methyl substituents which comprises contacting a perhydroaromatic hydrocarbon having three rings and at least twelve carbon atoms at a temperature in the range of —5 to +50° C. with an aluminum halide catalyst, and continuing such contact until at least a substantial proportion of the perhydroaromatic has been converted to hydrocarbon product having adamantane structure.

2. Method according to claim 1 wherein the perhydroaromatic has twelve carbon atoms and said hydrocarbon product is mainly dimethyladamantane.

3. Method according to claim 1 wherein the perhydroaromatic has thirteen carbon atoms and said hydrocarbon product is mainly trimethyladamantane.

4. Method according to claim 3 wherein the perhydroaromatic is perhydrofluorene.

5. Method according to claim 1 wherein the perhydroaromatic has fourteen carbon atoms and said hydrocarbon product is mainly tetramethyladamantane.

6. Method according to claim 5 wherein the perhydroaromatic is perhydroanthracene.

7. Method according to claim 5 wherein the perhydroaromatic is perhydrophenanthrene.

8. Method according to claim 1 wherein said catalyst is a pre-formed liquid complex obtained by reacting $AlCl_3$, HCl and paraffin hydrocarbon having at least seven carbon atoms.

9. Method according to claim 1 wherein said catalyst is a pre-formed liquid complex obtained by reacting $AlBr_3$, HBr and paraffin hydrocarbon having at least seven carbon atoms.

10. Method according to claim 1 wherein said contacting is continued until at least a major part of the hydrocarbon product has all its methyl substituents at bridgehead positions.

11. Method of preparing perhydroacenapthene in which the decalin portion of the structure has trans configuration which comprises contacting a $C_{12}$ perhydroaromatic having three rings, other than said perhydroacenaphthene, at a temperature in the range of —5 to +10° C. with an aluminum halide catalyst, and stopping the reaction before a substantial amount of hydrocarbon product of adamantane structure has been formed.

12. Method of preparing perhydrobenzonapthene which comprises contacting a $C_{13}$ perhydroaromatic, other than perhydrobenzonaphthene, at a temperature in the range of —5 to 40° C. with an aluminum halide catalyst, and stopping the reaction before a substantial amount of hydrocarbon product of adamantane structure has been formed.

13. Method according to claim 12 wherein said perhydroaromatic is perhydrofluorene.

14. Method of preparing trans-syn-trans perhydroanthracene which comprises contacting a $C_{14}$ perhydroaromatic selected from the group consisting of perhydrophenanthrenes and perhydroanthracenes other than said trans-syn-trans perhydroanthracene at a temperature in the range of —5 to +10° C. with an aluminum halide catalyst, and stopping the reaction when at least a major proportion of the hydrocarbon product is trans-syn-trans perhydroanthracene.

15. Method of preparing methylperhydrobenzonaphthene which comprises contacting a $C_{14}$ perhydroaromatic having three rings, other than methylperhydrobenzonaphthene, at a temperature in the range of —5 to +40° C. with an aluminum halide catalyst, and stopping the reaction when at least a major proportion of the hydrocarbon product is methylperhydrobenzonaphthene.

16. Method of preparing 1,3-dimethyladamantane which comprises contacting a $C_{12}$ perhydroaromatic having three rings at a temperature in the range of 20–50° C. with an aluminum halide catalyst, and continuing such contact until at least a major portion of the hydrocarbon product is 1,3-dimethyladamantane.

17. Method of preparing trimethyladamantanes which comprises contacting a $C_{13}$ perhydroaromatic having three rings at a temperature in the range of 20 to 50° C. with an aluminum halide catalyst, and continuing such contact until at least a major portion of the hydrocarbon product is trimethyladamantanes.

18. Method according to claim 17 wherein said contacting is continued until at least a major portion of the product is 1,3,5-trimethyladamantane.

19. Method of preparing tetramethyladamantanes which comprises contacting a $C_{14}$ perhydroaromatic hydrocarbon having three rings at a temperature in the range of 20 to 50° C. with an aluminum halide catalyst, and continuing such contact until at least a major portion of the hydrocarbon product is tetramethyladamantanes.

20. Method according to claim 19 wherein said contacting is continued until at least a major portion of the product is 1,3,5,7-trimethyladamantane.

No references cited.